3,458,460
UNSATURATED POLYESTERS CROSS-LINKED BY DIELS-ALDER REACTION
Alvin F. Shepard, Grand Island, and William F. Zimmer, Elnora, N.Y., and John T. Ouderkirk, Westerly, R.I., assignors to Hooker Chemical Corporation, Niagara Falls, N.Y., a corporation of New York
No Drawing. Continuation-in-part of application Ser No. 254,498, Jan. 28, 1963. This application Nov. 27, 1967, Ser. No. 685,945
Int. Cl. C08g 17/14, 17/16, 27/00
U.S. Cl. 260—22
4 Claims

ABSTRACT OF THE DISCLOSURE

A cross-linked polymer is prepared by reacting an unsaturated linear polyester having at least two dieneophile unsaturation groups with a compound containing a plurality of separately conjugated diene groups and selected from the group consisting of:
(A) an ester of an alcohol of 3 to 8 hydroxyl groups and 3 to 15 carbon atoms and a carboxylic acid having a conjugated diene group and 5 to 20 carbon atoms; and
(B) 2-vinyl butadiene.
The cross-linked polymers form tough molded articles having good flexibility.

Reference to prior application

This is a continuation-in-part of our copending application Ser. No. 254,498, filed Jan. 28, 1963, now abandoned.

This invention relates to new compositions of thermoset polymers and improvements in the means of cross-linking unnaturated linear ploymers and more particularly to polyester polymers.

The cross-linking of unsaturated linear polymers (particularly polyesters) may be accomplished by copolymerization with an ethylenic compound such as styrene, acrylonitrile, vinyl acetate, and so forth, and using a free radical producing catalyst such an benzoyl peroxide. This method of cure may be unsatisfactory from several viewpoints, namely, (1) the well known oxygen inhibition of cure may cause a unsatisfactory curing of thin sections unless they are protected from air, (2) the shrinkage on cure is high (often 7 to 10 percent by volume), (3) the chance introduction of trace amounts of metal salts may cause premature gelling by activating the catalyst and (4) the relatively high volatility of many of the ethylenic monomers creates a vapor hazard either from poisoning or fire.

The present invention provides new compositions of thermoset polymers and a means of cross-linking unsaturated linear polymern which is operable over a greater range of curing conditions than possible with the ethylenic cross-linking method mentioned above.

Accordingly, it is an object of this invention to provide environmental resistant means for cross-linking unsaturated linear polymers. Another object is to provide new composition of thermoset polymers. Other objects will also become apparent to those skilled in the art upon reference to the following detailed description and the examples.

In accordance with this invention there is provided a method for polymerizing unsaturated linear polymers by reacting a compound containing two or more separately conjugated diene groups with a dieneophile unsaturated linear polymer until the desired degree of polymerization has been obtained. Heat may be employed to effect the reaction.

The desired polymerization in obtained by creating linkages between the unsaturated linear polymer molecules with compounds containing at least two separately conjugated diene groups, which react by the Diels-Alder reaction forming cyclohexene rings. The rate of the desired polymerization depends primarily on the temperature and proportion of reactants. The polymerization occurs by Diels-Alder addition and, therefore, is comparatively insensitive to the presence of catalysts, inhibitors or the chance pickup of trace amounts of metal salts. Further, the cross-linking agents may have very low volatility, the shrinkages of the polymers are deceased, and the polymerization is essentially unaffected by air.

In the Diels-Alder reaction, compounds containing double or triple bonds add to the 1, 4 positions of a conjugated diene group with the formation of six-membered rings. The ease of addition of the unsaturated compound to the conjugated diene is greatly enhanced by carbonyl groups adjacent the point of unsaturation. The reaction is illustrated below:

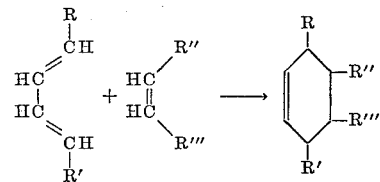

R and R' being the balance of the conjugated diene compound and R" and R'" being the balance of the dieneophilic unsaturated linear polymer.

Many types of polymers may be cross-linked by this invention. Among the more useful polymers that this invention is applicable to are the unsaturated linear polyesters. Thus, when a linear dieneophilic polymer is a polyester based on maleic anhydride the reaction may be illustrated:

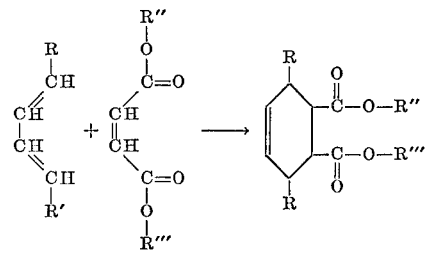

The fusible dieneophile polyesters employed in this invention are preferably the unsaturated reaction products of di- or poly-hydric alcohols and di- or poly-basic acids. Mixtures of alcohols or acids may be utilized to achieve special properties. The reactants may be halogenated or may contain substituted groups. Additionally, the reactants may be aliphatic or aromatic (including bicyclic). It is desirable for the unsaturation of the polyester molecule to occur adjacent to the carbonyl group. However, the polyester employed in this invention should contain on the average more than 2 units of unsaturation per molecule when the cross-linking compound is difunctional, that is contains two separately conjugated diene groups. The polyester may contain fewer than 2 dieneophile groups per molecule when polyfuctional cross-linking compounds are employed.

Briefly, the polyester is prepared as follows: The proportion of alcohol is controlled by the total mol proportion of acids in the esterification reaction mixture. A monohydric alcohol or mono-basic acid may be added in minor amounts to control the molecular weight of the unsaturated dieneophile polyester. The temperature for carrying out the reaction between polybasic acids and polyhydric alcohols may range from 100 to 200 degrees centigrade, although higher or lower temperatures can be used; preferably 150 to 180 degrees centigrade is employed. An inert gas such as nitrogen may be passed through the mixture in a preferred procedure to accelerate the progress of the reaction and to protect against oxidation and discoloration of the product. Esterification catalysts such as benzene sulphonic acid and paratolune sulphonic acid and amines such as pyridine or triethyl amine may be added to the reaction mixture to facilitate esterification of the reactants.

Suitable unsaturated polycarboxylic acids and the corresponding anhydrides, and acid halides that can be employed in the preparation of the polyesters can include maleic, chloromaleic, ethylmaleic, itaconic, citraconic, pyrocinchoninic and acetylene dicarboxylic, either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, hexene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic, or heterocyclic. Illustrative of these polycarboxylic acids, acid halides, acid anhydrides and acid esters include phthalic, isophthalic, terephthalic, tetrachlorophthalic, tetrabromophthalic, chlorendic, adipic, succinic, and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, glycerol, mannitol, sorbitol, bisphenols, substituted bisphenols, hydrogenated bisphenols and mixtures thereof.

The properties of the polyesters can be varied by using mixtures of the various types of acids and alcohols, such as an unsaturated acid, a saturated acid and a saturated alcohol.

The conjugated diene containing cross-linking compound of the invention is selected from at least one number of the group consisting of:

(A) an ester of an alcohol of 3 to 8 hydroxyl groups and 3 to 15 carbon atoms and a carboxylic acid having a conjugated diene group and 5 to 20 carbon atoms; and (B) 2-vinyl butadiene.

Suitable carboxylic acids having a conjugated diene group include sorbic acid (2,4-hexadienoic acid), 2,4-pentadienoic acid, 2-furanacrylic acid, eleostearic acid, licanic acid, isanic acid, isanolic acid, 9-hydroxy-trans, trans-10,12-octadecadienoic acid, trans-8,10,12-octadecatrienoic acid, α-kamlolenic acid, β-kamlolenic acid, abietic acid, neoabietic acid, levopimaric acid, and the like. The long chain fatty acids of the foregoing group can be obtained from oils such as tung oil, oiticica oil, isano oil, dimorphotheca seed oil, and kamela seed oil. The abietic-type acids can be obtained from rosin or pine sap. The oils are polyesters, and can thus serve as the polyester cross-linking agents as such.

Suitable polyhydric alcohols used in preparing the cross-linking agents include pentaerythritol, dipentaerythritol, tripentaerythritol, trimethylolpropane, trimethylolethane, trimethylolbutane, trimethylolisobutane, trimethylolpentane, trimethylolhexane, trimethylolnonane, trimethylolpropane, trimethylolbutene, trimethylolpentene, glycerol, sorbitol, hexanetriol, butanetriol, and the like. The foregoing alcohols can be substituted with non-interfering substituents such as chlorine, bromine, fluorine, iodine, alkyl, and aryl substituents such as phenyl, naphthyl, and the like. Generally preferred are the unsubstituted (containing only carbon, hydrogen and oxygen) aliphatic alcohols having three to about ten carbon atoms. The alcohols generally have three to four hydroxyl groups, and three to six carbon atoms.

Preferably, the alcohols and acids are reacted in a ratio of about one mole of acid per equivalent of alcoholic hydroxyl group.

Unsaturated polyesters are, of course, capable of becoming cross-linked by the simple polymerization of the unsaturated groups contained in them. Also, as mentioned previously, mixtures of an unsaturated polyester with simple ethylenic monomer can undergo cross-linking by the copolymerization of the unsaturated groups of the polyester with the ethylenic monomer.

However, such cross-linking reactions involving simple polymerization or copolymerization of the unsaturated groups are of minor consequence compared to cross-linking by the Diels-Alder reaction of the present invention.

The compositions which result from our invention have a very significant difference from those obtained by copolymerization with an ethylenic compound. In the latter case, the polymer chains are usually linked by a two carbon atom bridge while the Diels-Alder type of cross-linking can produce almost any length of bridge which is desired. As a result, the compositions of our invention have greater flexibility and extensibility and, moreover, the flexibility and extensibility of the invented material can be varied as desired between wide limits.

The proportion of the invented cross-linking agent to unsaturated polyester can be varied within the ultimate limits of each, without departing from the scope of this invention, in order to make the solution or mixture of this invention which can be set to the infusible, insoluble polyester polymer. For example, only a small proportion of the invented cross-linking agent is needed when the proportion of reactive cross-linkage olefinic bonds in the unsaturated polyester is very small and still a smaller proportion of invented cross-linking agent can be employed if it is desired to react only a part of the total of the unsaturated bonds in such polyester in the cross-linking reaction. On the other hand, a major portion of diene cross-linking agent to unsaturated polyester may be employed when the proportion of reactive cross-linkage olefinic bonds in the unsaturated polyester is high, and a still higher proportion of the invented cross-linking agent will be required if it is desired to react a major part of the total of the unsaturated bonds in such polyester in the cross-linking reaction. In general, the concentration of the unsaturated polyester in the invented cross-linking agent and unsaturated polyester mixture may vary between about 10 and 90 percent. In certain formulations and in order to accentuate a large number of desirable properties in the polyester polymer produced, it is preferable to employ between about 15 and 45 percent of the diene cross-linking agent by weight of the total polymer and diene cross-linking agent, for example, glycerine trisorbate when the unsaturated polyester is similar to that produced in Example 1 below. Thus for example, an unsaturated polyester having a molecular weight of about 5000 and containing an average of about 5 double bonds per molecules can be cross-linked with as little as about 10 percent by weight of glycerine trisorbate. On the other hand an unsaturated polyester of about 400 molecular weight and containing about 3 double bonds per molecule can be cross-linked with as much as 250 percent by weight of glycerine trisorbate. However, it is to be understood that this preferred concentration is a variable which is related to the particular properties of the materials employed and the particular properties desired in the polyester polymer produced.

The cross-linking of linear unsaturated polymers is performed at temperatures from about room temperature to the temperature at which Diels-Alder adducts begin to dissociate, that is, from about 20 to about 200 degrees centigrade. However, it is desirable to employ temperatures from about 100 to about 185 degrees centigrade in order that the cross-linking may be accomplished within a reasonable period of time. The time to obtain the desired amount of cross-linking is dependent upon temperature, amount of cross-linking agent employed and nature of polymer being cross-linked. This, the time required may vary from about 5 minutes to about 30 hours.

The invention is illustrated by but not limited to the following examples. Temperatures are given in degrees centigrade and parts are expressed by weight unless indicated otherwise.

Example 1.—Preparation of polyester

A triethylene glycol maleate resin was prepared by heating 308 g. of maleic anhydride, 450.6 g. of triethylene glycol, and 0.76 g. of p-toluhydroquinone for five hours with agitation at 190–199 degrees centigrade in a flask equipped with a distilling head. During this period 34.3 ml. of water were taken off. The system was then held at 200 degrees centigrade and a pressure of 200 mm. of mercury for five hours while an additional nine ml. of water were removed. The polyester was then heated at 200 degrees centigrade and six mm. of mecury for three hours. After cooling to approximately 150 degrees centigrade, 0.76 g. of p-toluhydroquinone was thoroughly mixed into the resin. At all times during this preparation the reaction was protected from air by blanketing with nitrogen. This resin had an acid number of 14.6 and contained 0.35 meq./g. of hydroxyl groups per gram of resin.

Example 2.—Preparation of polyester

A polyester resin was prepared from 1.00 mole of maleic anhydride, 0.25 mole of dicyclopentadiene, 1.05 mole of propylene glycol, and a trace of p-t-butylcatechol, using the technique described in Example 1. The esterification was continued until an acid number of less than 40 was obtained.

Example 3

A mixture containing 25 parts of tung oil, the polyester of glycerine and eleostearic acid, and 75 parts of a propylene maleate resin (acid number 30, 0.54 meg. OH/g.), described in Example 2, was heated to 200 degrees centigrade to aid in dissolving the components thereof, and was then cured at 175 degrees centigrade for 10 hours. Similar treatment did not gel either of the components alone.

Similar cure resins are obtained by replacing the tung oil with glycerides of abietic acid and of rosin.

Example 4

Pentaerythritol tetrasorbate was prepared by heating 197.3 grams of sorbic acid, 54.4 grams of pentaerythritol, 10 grams of p-toluenesulfonic acid, and 0.25 gram of p-toluhydroquinone in 400 milliliters of xylene. The reaction flask was equipped with a nitrogen inlet, agitator, and an azeotroping head. The xylene solution was held at reflux temperature until 94 percent of the theoretical amount of water was removed. After cooling, the solution was filtered. Then the solution was washed with brine and then with a dilute solution of sodium hydroxide. Finally a xylene-benzene solution of product was obtained, which was inhibited by adding 0.2 grams of p-toluhydroquinone. The solvents were evaporated to provide 40 grams of product having a carboxyl value of 0.08 milliequivalent per gram and a hydroxyl value of 1.31 milliequivalents per gram.

A mixture of 43.8 grams of this pentaerythritol tetrasorbate, 69.0 grams of the triethylene glycol maleate resin described in Example 1, and 0.5 gram of p-toluhydroquinone was cured at 125 degrees centigrade for 24 hours. The resultant gel was flexible and considerably tougher than samples of the same resin cured with ethylene disorbate.

Example 5

A mixture of glycerine trisorbate (prepared from glycerine and sorbic acid by the azeotropic distillation method used for the pentaerythritol sorbate of Example 4) and propylene maleate resin (as described in Example 2) was given a hot plate cure at about 165 degrees centigrade with control samples of propylene maleate and glycerine trisorbate. No change was detectable in the controls during the time required to gel the mixture.

Example 6

The polyester described in Example 2 is cross-linked with 2-vinylbutadiene in the manner of Example 4.

Cross-linking may be obtained in a manner similar to that employed with the maleates, as shown above, by the use of fumarates, itaconates, and citraconates. In general, linear polymers containing unsaturation capable of participating in the Diels-Alder reaction may be utilized as the unsaturated linear polymer.

Various changes and modifications may be made in the method and apparatus of the invention, certain preferred forms of which have been herein described, without departing from the spirit and scope of the present invention.

We claim:
1. A cross-linked polymer of an unsaturated linear polyester of a polycarboxylic compound and a polyhydric alcohol, said polyester having at least two dieneophile unsaturation groups; and a compound containing a plurality of separately conjugated diene groups and selected from at least one member of the group consisting of tung oil, oiticia oil, isano oil, dimorphotheca seed oil, kamela seed oil and 2-vinyl butadiene; said compound containing diene groups being present in a proportion of about 10 to 90 weight percent of said compound containing diene groups and said polyester.
2. The polymer of claim 1 wherein the compound containing diene groups is tung oil.
3. The polymer of claim 1 wherein the compound containing diene groups is 2-vinyl butadiene.
4. A shaped article having the composition of claim 1.

References Cited

UNITED STATES PATENTS

| | | | |
|---|---|---|---|
| 2,188,884 | 1/1940 | Clocker | 260—18 |
| 2,852,487 | 9/1958 | Maker | 260—872 |
| 3,078,253 | 2/1963 | Davies | 260—75 |
| 3,252,941 | 5/1966 | Mayer | 260—861 |

MURRAY TILLMAN, Primary Examiner

JOHN J. GOOLKASIAN, Assistant Examiner

U.S. Cl. X.R.

260—75, 861, 872